United States Patent
Gree et al.

(10) Patent No.: US 9,281,872 B2
(45) Date of Patent: Mar. 8, 2016

(54) NEAR-FIELD COMMUNICATION AUTHENTICATION

(71) Applicant: NXP B.V.

(72) Inventors: Maxime Gree, Bretteville sur Odon (FR); Kyuhyun Kim, San Jose, CA (US)

(73) Assignee: NXP B.V., Eindhoven (NL)

( * ) Notice: Subject to any disclaimer, the term of this patent is extended or adjusted under 35 U.S.C. 154(b) by 611 days.

(21) Appl. No.: 13/651,873

(22) Filed: Oct. 15, 2012

(65) Prior Publication Data

US 2014/0106670 A1    Apr. 17, 2014

(51) Int. Cl.
*H04B 5/00*    (2006.01)

(52) U.S. Cl.
CPC ............ *H04B 5/0056* (2013.01); *H04B 5/0031* (2013.01); *H04B 5/0037* (2013.01)

(58) Field of Classification Search
None
See application file for complete search history.

(56) References Cited

U.S. PATENT DOCUMENTS

| | | | |
|---|---|---|---|
| 8,224,246 B2* | 7/2012 | Suumaki et al. | 455/41.1 |
| 8,280,304 B2* | 10/2012 | Hirsch | 455/41.1 |
| 8,447,233 B2* | 5/2013 | Hirsch | 455/41.1 |
| 8,744,348 B2* | 6/2014 | Fine et al. | 455/41.1 |
| 8,811,897 B2* | 8/2014 | Matsumoto et al. | 455/41.1 |
| 8,818,276 B2* | 8/2014 | Kiukkonen et al. | 455/41.2 |
| 2010/0041332 A1* | 2/2010 | Flygh et al. | 455/41.1 |
| 2013/0036231 A1* | 2/2013 | Suumaki | 709/228 |
| 2013/0045682 A1* | 2/2013 | Kang et al. | 455/41.1 |
| 2013/0102247 A1* | 4/2013 | Hillan et al. | 455/41.1 |
| 2013/0309964 A1* | 11/2013 | Hall et al. | 455/41.1 |
| 2014/0025577 A1* | 1/2014 | Lisznianski | 705/44 |

* cited by examiner

*Primary Examiner* — Tuan A Tran

(57) ABSTRACT

Various aspects are directed to circuit apparatuses, portable electronic devices, and executable applets pertaining to storing and providing secure access to data. As consistent with one or more embodiments, an apparatus includes a memory circuit that stores executable applet data, a near-field communication (NFC) controller that communicates and receives power via an NFC antenna, and a secure element connected to and powered by the NFC controller circuit (e.g., and operable within a portable device). The secure element executes the applet data as follows. In response to an update command and identification (ID) data, the secure element operates in an update mode by storing the ID data. In response to a read command, the secure element operates in a read mode by providing access to the stored ID data. In response to a read-only command, the secure element operates in a read-only mode by providing read-only access to the stored ID data and preventing changes to the stored ID data. With this approach, the ID data can be stored (e.g., in a manufacturing environment) and future changes thereto can be prevented.

21 Claims, 2 Drawing Sheets

NEAR-FIELD COMMUNICATION AUTHENTICATION

Figure 1:
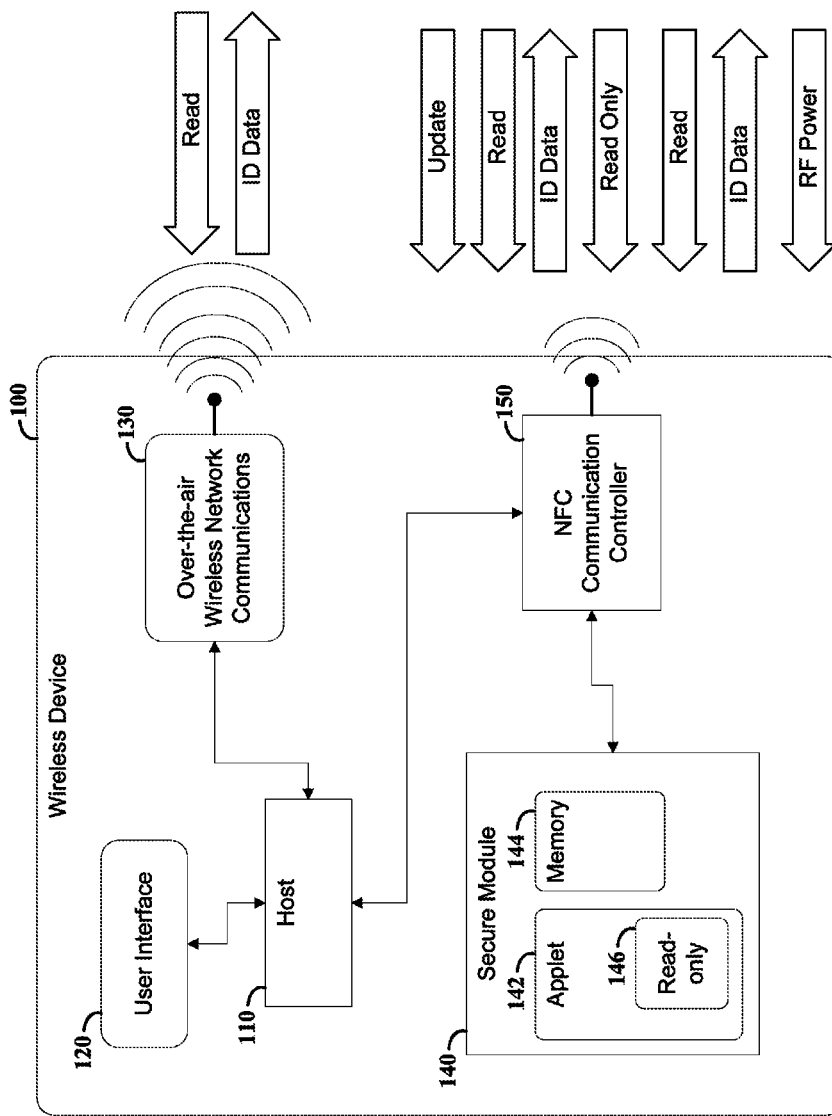

Wireless communications circuits are widely used in local communications for a variety of applications benefitting from the secure or otherwise protected communication of data. For instance, portable devices such as telephones, tablets and others can be used to communicate wirelessly with a variety of other communications circuits. Other types of wireless communication circuits are used to control access, or enable operation of other circuits (e.g., in vehicles). These and other implementations can be useful in a variety of manners.

One particular type of wireless communication in which the security of communicated data is important involves the contactless communication of information, such as for authentication or payment authorization. For such communications, various requirements/specifications have been implemented to define the manner in which such data is to be communicated. Mobile devices carrying out such applications may include a wireless communication circuit, such as a radio frequency (RF) interface circuit, that operates in connection with a micro controller to execute particular functions.

To facilitate secure wireless communications, applets (executable module/code) have been used within portable devices, such as within a mobile phone host, together with an RF interface. In many applications, a user input such as a personal identification number (PIN) is required to be provided by a user, generally via the mobile device, in order to authorize data communication (e.g., and therein authorize a transaction). In some implementations, such a user input is entered before a communication for a payment type transaction is effected (e.g., when a user wants to speed up the payment process). In other implementations, the user input is provided in response to a prompt, such as via the user's hand-held device or a payment terminal with which the hand-held device communicates. Such communications are often carried out using near-field communications (NFC), which can require a relatively short distance (e.g., 20 centimeters) between the device and a terminal with which the device communicates.

While these approaches to communications are useful, their implementation has been limited in various contexts. For instance, the storage of information useful for various purposes can be difficult to achieve in a secure manner. Moreover, when power is lost or desirably low/off, access to such information is difficult or impossible. These and other matters have presented challenges to the implementation of secure components for a variety of applications.

Various example embodiments are directed to secure data storage applications and related apparatuses, and their implementation.

As consistent with one or more embodiments, an apparatus includes a memory circuit that stores executable applet data, a near-field communication (NFC) controller that communicates and receives power via an NFC antenna, and a secure element connected to and powered by the NFC controller circuit (e.g., and operable within a portable device). The secure element executes the applet data as follows. In response to an update command and identification (ID) data, the secure element operates in an update mode by storing the ID data. In response to a read command, the secure element operates in a read mode by providing access to the stored ID data. In response to a read-only command, the secure element operates in a read-only mode by providing read-only access to the stored ID data and preventing changes to the stored ID data.

With these approaches, the ID data can be stored (e.g., in a manufacturing environment) and future changes thereto can be prevented. Moreover, access to the ID data can be limited to the secure element, such that other aspects of the device (e.g., a host controller) can access the ID data only via the applet executed by the secure element. Further, access to the ID data can be provided via a NFC antenna, which may also be used to power the apparatus (e.g., in a factory setting, before the chip/circuit including the apparatus is installed in an end-user device and powered thereby).

Another example embodiment is directed to an apparatus having a wireless communication circuit for over-the air wireless communications (e.g., using a first protocol), and a near-field communication circuit for near-field communications (e.g., using a second protocol that is different than the first protocol) and for receiving power. The apparatus also includes a first (host) circuit, a second NFC controller circuit, and a third secure element circuit. The first circuit communicates with remote transceivers via the wireless communication circuit, and the second circuit communicates with local near-field communication devices via the near-field communication circuit, and receives power via the near-field communication circuit. The third circuit is connected to and operable in response to the first circuit, is operable using power received via the near-field communication circuit and/or provided within the apparatus (e.g., a battery), and operates in update, read and read-only modes. In the update mode, identification (ID) data received via the near-field communication circuit and the second circuit is stored, and access to the stored ID data is facilitated in the read mode, via the near-field communication and second circuits. In the read-only mode, access to the stored ID data is restricted to read-only access and provided either: via the second circuit and the near-field communication circuit using the power received from the near-field communication circuit, and via the first controller circuit and the wireless communication circuit. For instance, the update and read modes can be used in a factory setting, using RF power, to store and check the ID data. Once the ID data is verified, the read-only command can be issued via the RF circuit, which sets the ID data and prevents further changes thereto.

The above discussion/summary is not intended to describe each embodiment or every implementation of the present disclosure. The figures and detailed description that follow also exemplify various embodiments.

Figure 2:
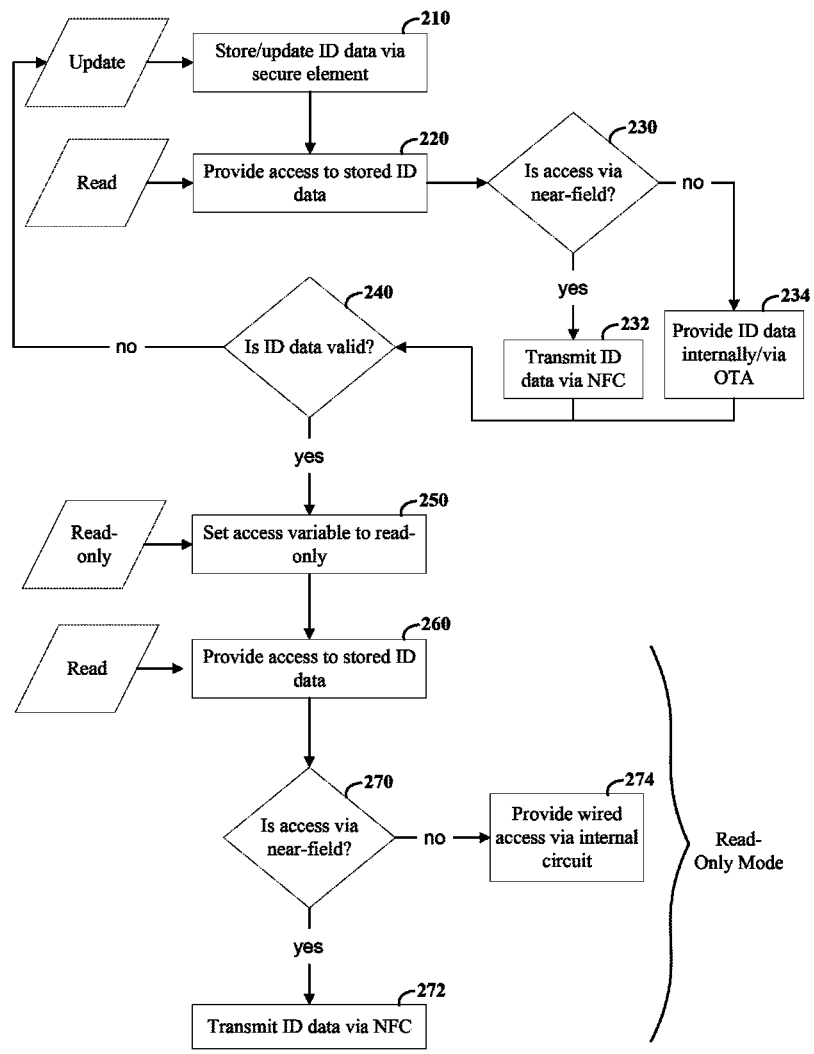

Various example embodiments may be more completely understood in consideration of the following detailed description in connection with the accompanying drawings, in which:

FIG. 1 shows an apparatus, in accordance with an example embodiment of the present invention; and FIG. 2 shows a flow diagram for near-field communications, in accordance with another example embodiment of the present invention.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving near-field communications, and to near-field communication circuits. While not necessarily so limited, various aspects may be appreciated through a discussion of examples using this context.

Various example embodiments are directed to identifying components in a near-field communications (NFC) device, and to doing so in a secure way. Identification information is accessed from a host or external reader (though a NFC interface), and written to a secure component during production to customize each circuit. Such information may, for example, include a product serial number or other fixed information. In some implementations, an applet is hosted in a secure way within a secure component, and contains the identification information specific to the device. Once the device is manufactured, this information is accessible but cannot be overwritten.

The various embodiments described herein may be implemented in a variety of manners. In some embodiments, executable program data such as an applet is stored within a secure component of a wireless communications circuit, and offers commands for reading information, updating information and setting stored data in a read-only mode. During a production phase, the applet is executed by using an "update" command to write all needed information, using a "read" command to check the value of written data, and a "read-only" command to freeze the stored information before the circuit is released (e.g., provided to a customer). Upon reception of the "update" command, the executed applet updates the current value stored in the EEPROM the secure component. On reception of the "read" command, the applet retrieves the current value set in EEPROM. Upon reception of the "read only" command, the applet blocks the access of the update command.

In a more particular embodiment, the identification information is made available on a baseband/host side of the device, and on an RF interface circuit. After storage, the identification information can be accessed via display on a user interface of the device, via sharing by remote communication (e.g., through a wireless telephone network such as a GSM network, and/or over the Internet), be accessed by an application executed within the device, or read with an external reader (e.g., in a store, at home, or in an administration office).

In some embodiments, various power modes are supported, with access to the identification information provided in respective modes. For example, identification information can still be provided under low battery conditions, or when powered by a radio frequency field (e.g., in passive card emulation, behaving like a NFC tag).

The following table exemplifies the implementation of read, update and read only commands, in accordance with a more specific example embodiment.

Under a read command, data that can be read may pertain to a product serial number, international mobile equipment identity (IMEI) code for mobile telephones, and other predefined information (e.g., with a combination of P1;P2 being defined for each type of information. For instance, an approach to storing identification information as discussed herein is implemented with a contactless interface to identify a product in which the information is stored, in a retail environment. Further, for either read or read only commands, information can be obtained through a wired mode (e.g., via a controller internally coupled to a secure component executing an applet), or through a contactless mode, such as via NFC links either operated actively (under power) or via RF power as an NFC tag.

In the context of various example embodiments, a secure element or component as discussed herein involves a circuit or circuits within a device that maintain and/or generate at least some proprietary data to which access is not provided for one or more of modification and use. Such data may involve, for example, a secure code that can be used by internal circuitry within the device to facilitate communications with external circuits, or to enable the operation of certain functions within the device. In some implementations, a secure element/component as described herein includes proprietary user data such as data that is used in transaction authorization with electronic payment. In other implementations, a secure element/component as described herein includes proprietary data used by circuitry within the device to operate functions, such as an applet, for a variety of implementations.

In accordance with various method-based approaches, applet data is stored in a memory circuit and executed in response to update, read and read-only commands as follows. In response to an update command and received identification (ID) data, an update mode is carried out in which the ID data is stored in the memory circuit. In response to a subsequently-received read command, a read mode is carried out in which access to the stored ID data is provided (e.g., to verify the data). In response to a read-only command, a read-only mode is carried out in which read-only access to the stored ID data is provided, and changes to the stored ID data are prevented. This read-only access to the ID data stored in the memory circuit is provided exclusively via execution of the applet data. In various implementations, one or more aspects of these methods are carried out using RF power received via a near-field communication antenna that is also used to receive the respective commands and ID data.

Turning now to the figures, FIG. 1 shows an apparatus 100, in accordance with an example embodiment of the present invention. The apparatus 100 includes a host controller 110 that operates the apparatus 100, to communicate with a user operating the device via a user interface 120, and to commu-

| Command | Command | Class | INS | P1 | P2 | Le | Info |
|---|---|---|---|---|---|---|---|
| Read | Product Serial Number | 0xFF | 0xB0 | 0x00 | 0x01 | 0xXX | Product Serial Number |
|  | IMEI | 0xFF | 0xB0 | 0x00 | 0x02 | 0xXX | IMEI |
|  | Others | 0xFF | 0xB0 | 0x00 | 0xXX | 0xXX |  |

| Command | Command | Class | INS | P1 | P2 | Lc | Data | Info |
|---|---|---|---|---|---|---|---|---|
| Update | Product Serial Number | 0xFF | 0xD6 | 0x00 | 0x01 | 0xXX | ... | Product Serial Number |
|  | IMEI | 0xFF | 0xD6 | 0x00 | 0x02 | 0xXX | ... | IMEI |
|  | Others | 0xFF | 0xD6 | 0x00 | 0xXX | 0xXX | ... |  |

| Command | Class | INS | P1 | P2 | Lc | Data |
|---|---|---|---|---|---|---|
| Read Only | 0xFF | 0xF0 | 0x00 | 0x00 | 0x00 | Disable the all Update commands | nicate with remote transceivers via an over-the-air wireless network communications circuit 130 as shown having an antenna. Such over-the-air communications may, for example, involve communications over a mobile telephone network, a Wi-Fi network, the Internet or a combination of these and/or other networks, using protocols for the respective network communications.

The apparatus 100 also includes a secure module 140 that communicates both with a near-field-communication (NFC) communication controller 150 having an NFC antenna for communicating via local devices (e.g., within a few centimeters) using a protocol therefor (and, e.g., different than protocols used via the over-the-air communications at 130), and also communicates with the host controller 110 via the NFC communication controller. The NFC communication controller 150 also receives RF power and provides the RF power to power the secure module 140 and, in some instances, to power other aspects of the apparatus 100.

The secure module 140 includes applet data 142 stored and executable to carry out various functions, using a memory 144 and a read-only function 146. The secure module 140 operates independently from the host controller 110, such that data accessed in memory 144 can be limited to access via execution of the applet data 142, with select data provided to the host 110 and/or the NFC communication controller 150 to suit various applications. This independent operation may, for example, be carried out responsive to commands received via the NFC communication controller 150, or received via the host controller 110 in which access to data in memory 144 is independently controlled (is not accessible directly by the host controller 110). Accordingly, while the host controller 110 may communicate with and at least partially control/initiate operation of the secure module 140, the secure module 140 is configured to independently operate and control the storage, update and read access to the stored ID data, and to prevent such control by the host controller.

The secure module 140 operates in update, read and read-only modes, responsive to respective update, read and read-only commands, as follows. In the update mode, the secure module 140 stores received identification (ID) data in the memory 144. The ID data may be received, for example, via the near-field communication controller 150 (as received via near-field communications), or via the host controller 110 as responsive to inputs via the user interface 120 and/or wireless inputs received via the over-the-air network communications circuit 130.

In the read mode, the secure module 140 provides access to stored ID data, such as to provide a confirmation of the data that is stored. This access may similarly be facilitated via the near-field communication controller 150 and near-field communication with an NFC reader-type device, or via the host controller 110.

In the read-only mode, the secure module 140 operates to restrict access to the ID data stored in memory 144 to read-only access. In some instances, this is carried out by setting a variable to a read-only value, with further changes to the variable being restricted, thereby limiting write-mode access to the ID data (e.g., limiting any overwriting or updating of the ID data). Such an approach may be implemented, for example, in a factory setting in which the ID data is stored, checked and then locked/secured from further alteration, prior to shipping the apparatus for use.

In implementations in which the ID data is provided to the host controller, access is provided by displaying information via a user interface display, using the ID data by an internally-executed application, or communicating the ID data via the over-the-air wireless communications circuit 130 (e.g., to a remote system communicating over a wireless network). Where the ID data is provided to the NFC communication controller 150, the ID data is communicated to a local near-field reader device. In other implementations, the ID data is accessed internally at the secure module using an applet that carries out the update, read and read-only modes, and provided therein to another applet running on the secure module (e.g., to a payment applet using the ID data to authorize payment).

As consistent with the above, the respective update, read, and read-only modes may be implemented under RF power received via the NFC communication controller 150, via power provided internally to the apparatus 100 (e.g., via battery or wired power), or a combination thereof. For instance, RF power may be used to execute the update, read and read-only commands, with system power used to execute further read commands after the read-only mode has been set.

In some embodiments, the update, read and read-only commands are carried out via RF power in a factory-type setting, and can be done with the secure module 140 and NFC communication controller 150, prior to integration with the rest of the apparatus 100. In some implementations, the secure module 140 and NFC communication controller 150 are integrated on a common device and powered via RF power to store ID data in the update mode, check the stored ID data in the read mode, and permanently set the stored ID data in the read-only mode such that no further updates to the data may be carried out. The integrated device is then placed in the apparatus 100 (e.g., at the same or different location/time), with further read-only access provided via either the NFC communication controller 150 or the host controller 110, powered via one or both of internal apparatus power or RF power.

In some implementations, the memory 144 (e.g., EEPROM) is exclusive to the secure element 140 and accessible only by applications executed on the secure element 140. In other implementations, the memory 144 is part of system memory on the apparatus 100, with access thereto limited to access by the secure element 140. In this latter approach, the read-only mode can be set by setting a stored variable to limit access to the stored ID data to read-only access by the secure element 140.

In a more particular example embodiment, the secure module 140 operates in the read-only mode by accessing and providing the ID data for use exclusively in response to security data received from either the host controller 110 or the NFC communication controller 150. Such security data may, for example, be a factory code used to access the device ID for the apparatus 100, or a user code such as a personal identification number (PIN) used to enable the access for applications such as purchase transactions, other electronic payment, or authentication for device access.

Other embodiments are directed to an apparatus including the secure module 140 alone, and still other embodiments are directed to an apparatus including the secure module 140 and the NFC communication controller 150. Such embodiments and the related apparatuses can be implemented with devices such as apparatus 100, which may include one or more of a mobile telephone, computer, laptop computer, tablet computer, portable media device, automotive-based device, global positioning device and others. The respective secure module 140 and NFC communication controller 150 can be implemented in accordance with one or more of the embodiments discussed above.

Various other embodiments are directed to method-based approaches, as may be consistent with one or more embodiments described herein. FIG. 2 shows a data-flow diagram for such method-based approaches in accordance with one or more example embodiments. At block 210, ID data is stored and/or updated in response to receiving an update command and the ID data to be stored, using a secure element such as discussed herein. Access to the stored ID data is provided at block 220, in response to a read command. If the read command is determined to have been received via near-field communications at block 230, the ID data is transmitted at block 232 via near-field communications. If the access is not determined as received via near-field communications at block 230, the ID data is provided at block 234 internally (e.g., via a user interface or for an operating application) or via an over-the-air communications circuit (e.g., a wireless network).

If the data provided at block 232 or 234 is determined not to be valid at block 240, the process reverts and waits for another update command. If the data provided at block 232 or 234 is determined to be valid at block 240, a read-only command is initiated and an access variable is set to a read-only value at block 250, which limits further access to the stored ID data to read-only access (e.g., the stored ID data cannot be modified).

Once the read-only mode has been set, further read requests are processed as follows. At block 260, access is provided to the stored ID data in response to a further read request. If the access is determined to be near-field access at block 270, the ID data is transmitted via near-field communications at block 272. If the access is not near-field access at block 270, the ID data is provided via a wired internal circuit at 274. In some embodiments, such wired access may involve, for example, access by an applet running within a secure element also running an applet that carries out the update, read and read-only functions as described herein. In other embodiments, the wired access involves access by a host controller such as described herein, which may, in turn, use the accessed ID data via an internal application, provide the ID data to a user via a user interface, or communicate the ID data to a remote transceiver via an over-the-air communication such a wireless network (e.g., wi-fi, telephone networks, the Internet).

The various embodiments described herein can be implemented using one or more of a variety of types of circuits, hardware, host and secure devices. In some embodiments, a near-field communication (NFC) frontend chip such as model PN544 is used with a secure component device such as a SmartMX contact interface controller, with an integrated circuit component such as models PN65N or PN65O, all available from NXP Semiconductors of Eindhoven, The Netherlands. The host device communicates with the secure component, and the secure component executes secure functions (e.g., for communicating identification information), and can be operated such that it is not powered at all times and also communicates via RF power. Near-field communications are effected using this approach, such as for the communication of contactless ID information, for establishing network presence, or other near-field (e.g., within a few centimeters) communication. These near-field communications can also effected for operation in various power states (e.g., normal/full power, low battery mode and passive modes (e.g., powered via radio frequency)).

The various embodiments discussed herein are implemented with a variety of different types of devices, to effect near field communications, such as communications involving a secure component, for many applications. For instance, one or more embodiments are directed to implementation with NFC-capable integrated circuits with mobile devices such as laptop computers, mobile telephones, tablets, and portable music players.

Various modules may be implemented to carry out one or more of the operations and activities described herein and/or shown in the figures. In these contexts, a "module" is a circuit that carries out one or more of these or related operations/activities (e.g., validating PINs, storing ID data, and others). For example, in certain of the above-discussed embodiments, one or more modules are discrete logic circuits or programmable logic circuits configured and arranged for implementing these operations/activities, as in the circuit modules shown in FIG. 1. Such modules may, for example, be implemented as part of a portable device such as a mobile telephone. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, certain modules include a combination of a CPU hardware-based circuit and a set of instructions in the form of firmware. In such an example, a first module may include a CPU hardware circuit with one set of instructions and a second module may include a second CPU hardware circuit (or the same CPU hardware circuit) with another set of instructions. Such modules may further implement circuit structures and/or functions as described in the above-referenced components available from NXP Semiconductors.

Certain embodiments are directed to a computer program product (e.g., nonvolatile memory device), which includes a machine or computer-readable medium having stored thereon instructions which may be executed by a computer (or other electronic device) to perform operations/activities as described herein.

Based upon the above discussion and illustrations, those skilled in the art will readily recognize that various modifications and changes may be made to the various embodiments without strictly following the exemplary embodiments and applications illustrated and described herein. For example, different types of host devices can be implemented with a secure component/module as discussed herein. Such modifications do not depart from the true spirit and scope of various aspects of the invention, including aspects set forth in the claims.

What is claimed is:
1. An apparatus comprising:
a wireless communication circuit configured and arranged to send and receive over-the-air communications using a first protocol;
a near-field communication circuit configured and arranged to send and receive near-field communications using a second protocol that is different than the first protocol, and to receive power via received near-field communications;
a first circuit configured and arranged to communicate with remote transceivers via the wireless communication circuit;
a second circuit configured and arranged to communicate via the near-field communication circuit with local near-field communication devices, and to receive power via the near-field communication circuit; and
a third circuit connected to and operable in response to inputs received via the first circuit and the near-field communication circuit, and to operate using power received via the near-field communication circuit, the third circuit being configured and arranged to operate in an update mode in which identification (ID) data received via the near-field communication circuit and the second circuit is stored;

operate in a read mode in which access to the stored ID data is facilitated via the near-field communication and second circuits; and in response to a read-only command, operate a read-only mode in which access to the stored ID data is restricted to read-only access, and in the read-only mode provide read-only access to the stored ID data via the second circuit and the near-field communication circuit using the power received from the near-field communication circuit, and provide the read-only access to the stored ID data via the first circuit and the wireless communication circuit.

2. The apparatus of claim 1, wherein the third circuit is configured and arranged to write the ID data in memory in response to receiving an update command while operating in the update mode, in response to receiving a read command while operating in the read mode, read back the value of the written ID data, and after receiving the read-only command, block access of future update commands, therein preventing modification of the ID data stored in the memory.

3. The apparatus of claim 2, wherein the memory is a secure memory configured and arranged for access exclusively via the third circuit.

4. The apparatus of claim 1, wherein the third circuit is configured and arranged to operate in the read only mode by setting a stored variable to a read-only value in response to the read-only command, and operate in the update and read modes based upon the stored variable not being the read-only value.

5. The apparatus of claim 4, wherein the third circuit is configured and arranged to set the stored variable to a read-only value by setting a data value within memory that cannot be changed after the value is set.

6. The apparatus of claim 4, wherein the third circuit is configured and arranged to set the stored variable to a read-only value by setting a data value within memory that is configured and arranged to prevent access by circuits other than the third circuit, after the stored variable is set to the read-only value.

7. The apparatus of claim 1, wherein the third circuit is configured and arranged to write the ID data in EEPROM within the third circuit in response to receiving an update command while operating in the update mode, in response to receiving a read command while operating in the read mode, read back the value of the written ID data, and after receiving the read-only command, block access of future update commands, therein preventing modification of the ID data stored in the EEPROM.

8. The apparatus of claim 1, wherein the third circuit is configured and arranged to provide read-only access to the stored ID data by at least one of providing read-only access to the first circuit, the first circuit being configured and arranged to use the ID data by at least one of: displaying the ID data on a user interface, using the ID data with an application executed by the first circuit, and communicating the ID data to a remote receiver via the wireless communication circuit, and providing read-only access to the third circuit, the third circuit being configured and arranged to use the ID data by at least one of communicating the ID data to a local near-field reader device via the near-field communication circuit, and using the ID data with a secure application executed by the third circuit.

9. The apparatus of claim 1, wherein the third circuit is configured and arranged to operate in the respective update, read and read-only modes by executing an applet stored in memory in the third circuit, the applet being configured and arranged to carry out the effective operation and having exclusive access to the memory in which the ID data is stored, and to operate in the read-only mode by setting a stored variable in the memory to a read-only value and rendering the stored variable unchangeable.

10. The apparatus of claim 1, wherein the third circuit is configured and arranged to provide the read-only access exclusively based upon security data received via one of the first and second circuits and stored security data accessible exclusively by the third circuit.

11. The apparatus of claim 1, wherein the wireless communication circuit is configured and arranged to send and receive wireless communications over the air to remote antennas using a mobile telephone communication protocol.

12. An apparatus comprising:

a memory circuit that stores executable applet data;

a first circuit configured and arranged to both communicate and receive power via a near-field communication antenna; and a second circuit connected to and powered by the first circuit and configured and arranged to execute the applet data to in response to an update command and identification (ID) data, operate in an update mode by storing the ID data;

in response to a read command, operate in a read mode by providing access to the stored ID data;

in response to a read-only command, operate in a read-only mode to provide read-only access to the stored ID data and preventing changes to the stored ID data, by setting a read-only data value, thereby limiting write-mode access to the ID data; and an over-the-air communications circuit including an antenna and configured and arranged to communicate the ID data, wherein access to the stored ID data via the over-the-air communications circuit is secured.

13. The apparatus of claim 12, wherein the first circuit is configured and arranged to use the near-field communication antenna to receive at least one of the update, read and read-only commands, to provide each received command to the second circuit, and to communicate the stored ID data provided by the second circuit.

14. The apparatus of claim 12, further including a third circuit, wherein the second circuit is configured and arranged to receive at least one of the update, read and read-only commands via at least one of the first and third circuits, and to provide access to the stored ID data via at least one of the first and third circuits.

15. The apparatus of claim 12, further including a third circuit, wherein the second circuit is configured and arranged to receive at least one of the update, read and read-only commands via at least one of the first and third circuits, the first circuit being configured and arranged to receive the commands via the near-field antenna and to provide the received commands to the second circuit, the first circuit being configured and arranged to receive the commands via at least one of a user input device and the over-the-air antenna, and in response to the read command, provide access to the stored ID data via at least one of the first and third circuits, the first circuit being configured and arranged to communicate the stored ID via the near-field antenna, and the third circuit being configured and arranged to provide access to the stored ID data by at least one of presenting the ID data via a user interface and communicating the ID data via the over-the-air antenna.

16. The apparatus of claim 12, further including a third circuit, and a user interface, the third circuit being configured and arranged to interface with users via the user interface, the first circuit being configured and arranged to execute applications independently of the third circuit, and the second circuit being configured and arranged to provide read-only access to the stored ID by at least one of
  providing read-only access to the third circuit, the third circuit being configured and arranged to use the ID data by at least one of: displaying the ID data on a user interface, using the ID data with an application executed by the first circuit, and communicating the ID data to a remote receiver via the over-the-air antenna, and
  providing read-only access to the first circuit, the first circuit being configured and arranged to use the ID data by at least one of communicating the ID data to a local near-field reader device via the near-field communication antenna, and using the ID data with an application executed by the first circuit.

17. A method comprising:
storing applet data in a memory circuit;
communicating and receiving power via a near-field communication antenna; and
executing the applet data, within a secure circuit of a hand-held electronic device including an over-the-air communications circuit having an over-the-air antenna circuit, to
  in response to an update command and identification (ID) data, and also in response to authorization data communicated via the over-the-air communications circuit, operate in an update mode by storing the ID data in the memory circuit;
  in response to a read command, operate in a read mode by providing access to the stored ID data; and
  in response to a read-only command, operate a read-only mode by providing read-only access to the stored ID data and preventing changes to the stored ID data, the read-only access to the ID data stored in the memory circuit being provided exclusively via execution of the applet data.

18. The method of claim 17, further including
using the near-field communication antenna to receive at least one of the update, read and read-only commands, and to communicate the stored ID data via near-field communication to a local reader device.

19. The method of claim 17, wherein
the applet data is executed to operate in the update and read modes in a factory setting using RF power received via the near-field communication antenna, to store and check the ID data, the read-only command being provided in response to verifying the stored ID data via the read command to thereby set the ID data and prevent further changes thereto.

20. A method comprising:
storing applet data in a memory circuit;
communicating and receiving power via a near-field communication antenna; and
executing the applet data, within a secure circuit of a hand-held electronic device including a controller circuit, a user interface and an over-the-air antenna, the secure circuit executing the applet data independently of the controller circuit, to
  in response to an update command and identification (ID) data, operate in an update mode by storing the ID data in the memory circuit;
  in response to a read command, operate in a read mode by providing access to the stored ID data; and
  in response to a read-only command, operate a read-only mode by providing read-only access to the stored ID data and preventing changes to the stored ID data, the read-only access to the ID data stored in the memory circuit being provided exclusively via execution of the applet data;
receiving at least one of the update, read and read-only commands via at least one of the near-field communication antenna and the controller circuit, the commands received via the controller circuit being communicated via at least one of the over-the-air antenna and the user interface; and
providing read-only access to the stored ID data by providing access via at least one of the near-field antenna and the controller circuit, the access provided via the controller circuit being via at least one of the user interface and the over-the-air antenna; and
using the near-field communication antenna to receive at least one of the update, read and read-only commands, and to communicate the stored ID data via near-field communication to a local reader device.

21. The method of claim 20, wherein
the applet data is executed to operate in the update and read modes in a factory setting using RF power received via the near-field communication antenna, to store and check the ID data, the read-only command being provided in response to verifying the stored ID data via the read command to thereby set the ID data and prevent further changes thereto, and
providing read-only access to the stored ID data includes providing read-only access, via execution of the applet data in the hand-held electronic device, to at least one of an application executed by the controller circuit, and an application executed by the secure circuit.

* * * * *